United States Patent Office 2,844,973
Patented July 29, 1958

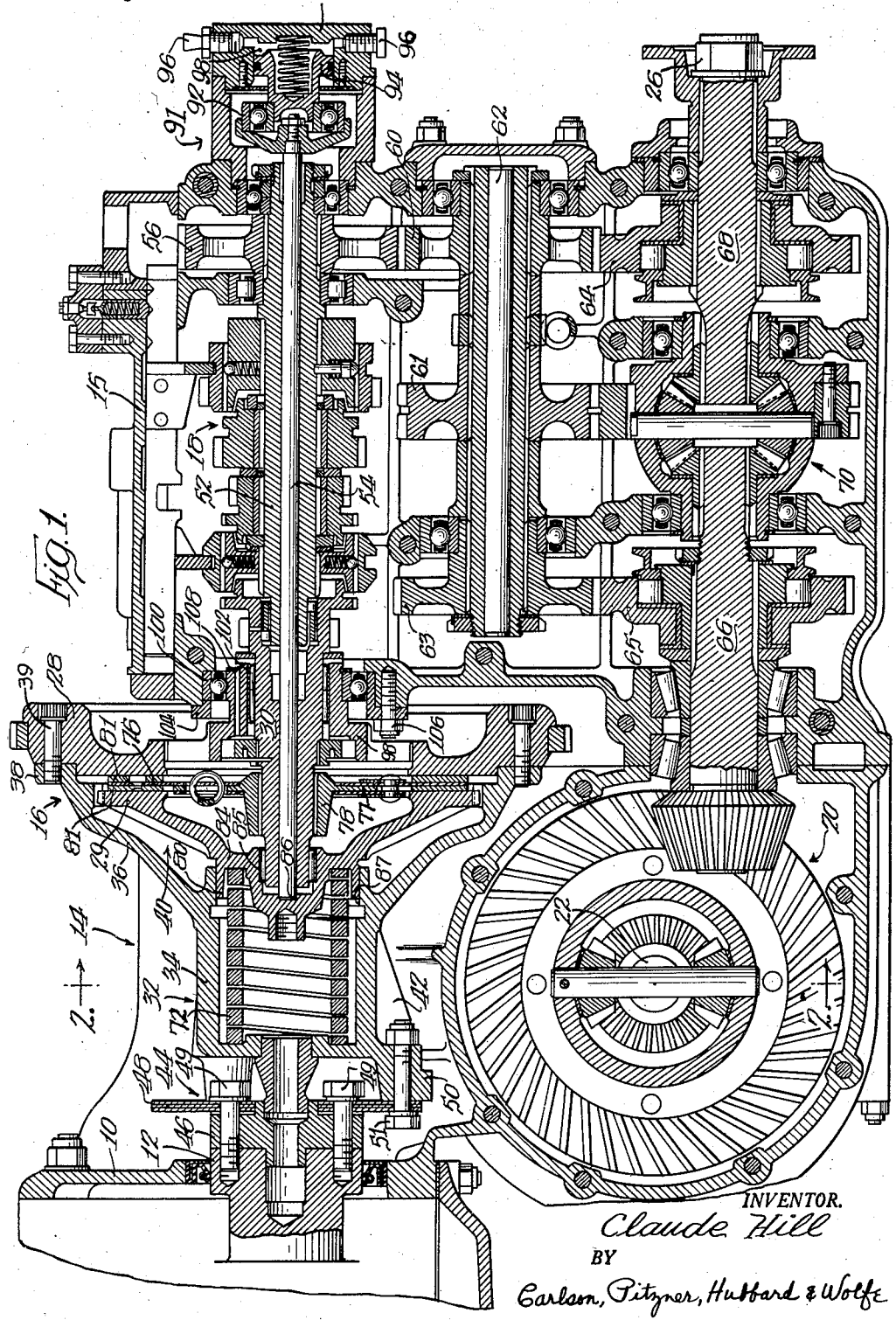

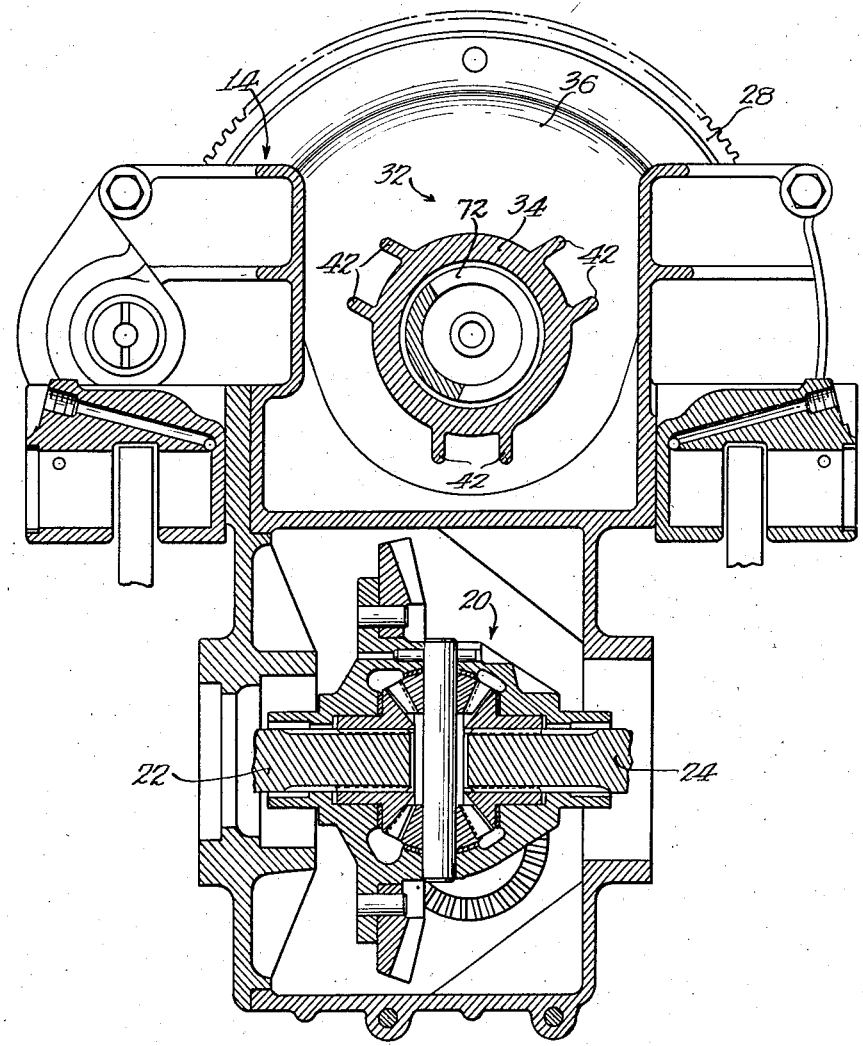

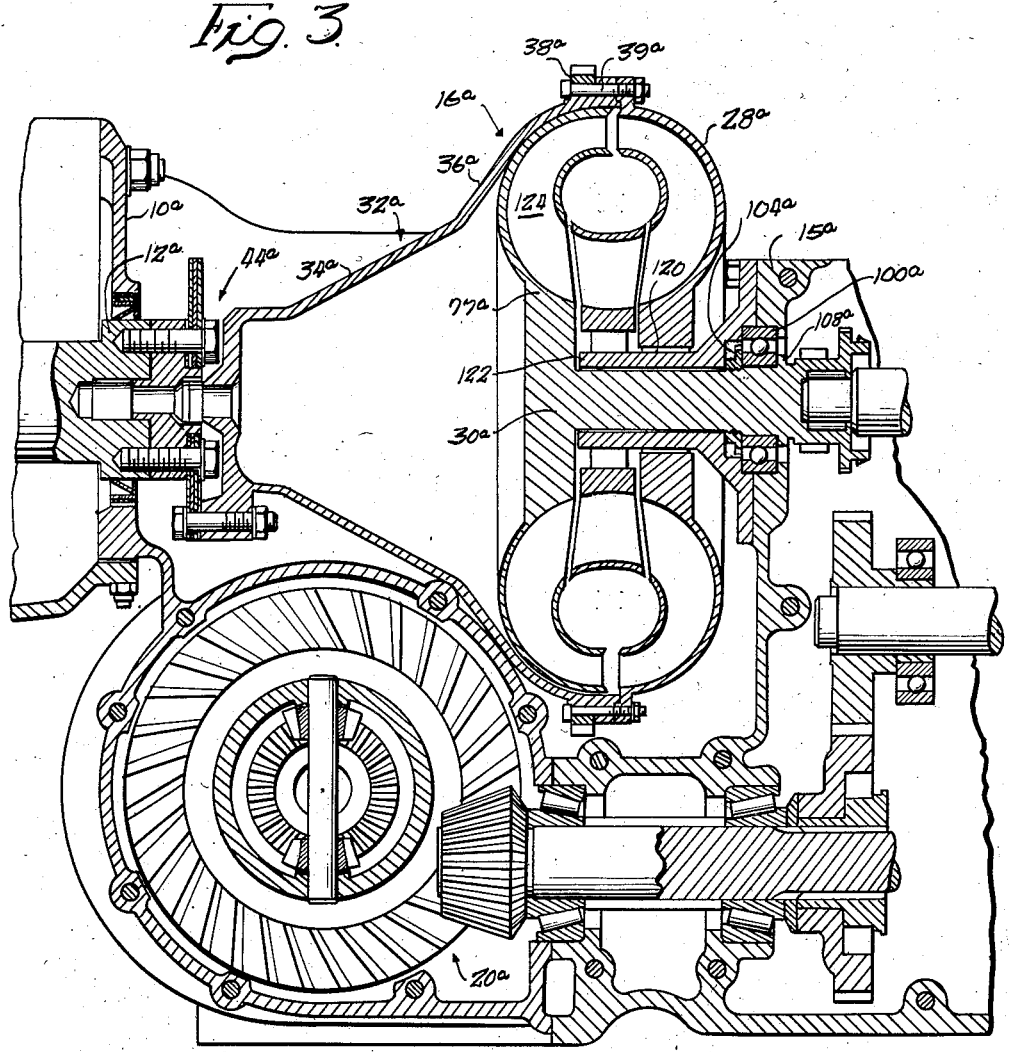

2,844,973

REMOTE CLUTCH ASSEMBLY FOR MOTOR VEHICLES

Claude Hill, Kenilworth, England, assignor to Harry Ferguson Research Limited, Abbotswood, Stow-on-the-Wold, England Application April 6, 1955, Serial No. 499,733

Claims priority, application Great Britain April 9, 1954

17 Claims. (Cl. 74—700)

The invention relates to motor vehicles in which an engine drives two or four road wheels through a transmission mechanism including a flywheel and clutch assembly, variable speed gearing and one or two differential gear arrangements interposed between the axles of the driven road wheels. More particularly, the invention is concerned with a transmission mechanism for a motor vehicle wherein the engine end of the vehicle is mounted on a pair of driven road wheels and thus incorporates thereon a differential gear arrangement.

In designing a motor vehicle of the type described, serious difficulties are met in arranging the various driving components to form a stable vehicle having requisite maneuverability and yet embodying desirable riding qualities. Many of these problems are presented in attaining a proper mounted relationship between the engine and the flywheel and clutch plate assembly and between these components and the inter-wheel differential gear arrangement. Such problems arise chiefly due to the large weight and size of such driving elements.

It is undesirable to arrange the engine too far outwardly beyond the differential gear because the overhanging mass of the engine causes heavy steering where the engine is in front of the vehicle and tends to cause over-steering where the engine is at the rear. Also, it has been found in practice that the large flywheel and clutch plate assembly, normally closely associated with the engine, cannot be expediently arranged outwardly relative to the differential gear because the resulting accentuated over-hang of the engine tends to be excessive.

On the other hand, it is undesirable to arrange the flywheel and clutch plate assembly directly above the differential gear because such arrangement imparts to the vehicle an impracticably high center of gravity.

It is not apparent that compactness could be achieved by arranging the differential gear between the engine and the flywheel and clutch plate assembly since it would then be necessary to excessively lengthen the engine crank-shaft in order to reach the spaced flywheel. Ordinarily such lengthening would be impracticable because the effect would be to reduce the natural periodicity of torsional vibration of the engine shaft and it is recognized that in any feasible construction this periodicity must be maintained substantially greater than the vibration periodicity set up by the engine within its normal speed range.

Accordingly, it is a general object of the present invention to overcome the foregoing difficulties by providing a novel clutch assembly which is remotely located with respect to a vehicle engine, thereby effecting the proper structural spacing of the vehicle driving components, and yet which is operably connected to the engine in a rigid and stable fashion. It is a related object of the invention to provide a remotely situated clutch assembly which is connected to a vehicle engine in such a manner that the torsional periodicity of the engine shaft is not materially different from that of a conventional engine shaft connected to a flywheel and clutch assembly arranged in close proximity to the engine.

It is a more detailed object of the present invention to provide a clutch assembly for remote spacing with respect to a vehicle engine, which assembly includes torsionally rigid connecting means between the engine and a flywheel-and-clutch plate unit.

It is another object of the invention to provide a remote clutch assembly including complemental flywheel and clutch plate components urged into frictional interengagement by single powerful spring means co-axial with such components. An ancillary object of the invention is to provide a remote clutch assembly including a clutch applying compression spring which is co-axial with the axis of rotation of the assembly and which is arranged to exert a centrally concentrated thrust on the clutch plate or presser of the assembly.

It is yet another object of the invention to provide a novel remote clutch assembly including means axially alined with the assembly for releasing the clutch interengaging components against the bias of a pre-loaded spring means.

Finally, it is an object of the invention to provide a remote clutch assembly which is of simple and rugged construction, which can be operated by simple and effective actuating means, and which requires a minimum of care and maintenance.

Other objects and advantages of the invention will become apparent upon reading the attached detailed description and upon reference to the drawings, in which:

Figure 1 is a vertical section taken longitudinally through the clutch organization, speed change transmission, and differential gear arrangement embodying the features of the invention as used with a typical vehicle engine.

Figure 2 is a vertical section taken transversely along the line 2—2 of Fig. 1.

Figure 3 is a vertical section, similar to that shown in Figure 1, taken longitudinally through another embodiment of the invention wherein a fluid torque converter is employed.

While the invention has been described in connection with a preferred embodiment, it will be understood that I do not intend to limit the invention thereto, but intend to cover all modifications and alternative constructions falling within the spirit and scope of the appended claims.

Turning now to the drawings, the invention is illustrated as embodied in a vehicle having an engine mounted at its front end. The engine may be of any suitable type and it is believed to be sufficient to note only that the engine block presents a rear face 10 through which its crank-shaft 12 extends. Bolted to the rear face 10 is a rearwardly and downwardly extending housing 14 which encloses the three main components required for power transmission, a clutch assembly 16, speed change transmission 18, and differential gearing arrangement 20, the latter being interposed between independently suspended half-axles (not shown) carried by the vehicle wheels (not shown). The housing 14, which includes a change speed gear case portion 15, is preferably completely closed and provided with suitable lubricating facilities. It will be observed that the housing 14 contains two transverse output shafts 22 and 24 (Fig. 2) extending from the differential arrangement 20 for the front half-axles, and a rear output shaft 26, extending from the gear case 15 to a rear wheel differential arrangement (not shown). Corresponding shaft openings are provided in the housing 14, each of which is provided with a suitable lubricant seal.

For the purpose of transmitting torque generated by the engine and imparted to the crankshaft 12 to the speed change transmission 18 and thence to the vehicle wheels, an engine flywheel 28 and an opposing cup-shaped clutch plate or presser 29 are arranged as a unit within the housing 14 in spaced relationship to the end of the crankshaft. It will be observed that both the flywheel 28 and the presser plate 29 are rotatably mounted on a hollow intermediate shaft 30, which is coaxial with the crankshaft 12 and serves as the input member to the speed change transmission 18. As will be described in more detail later, the flywheel 28 and presser plate 29 are arranged for frictional inter-engagement for transferring driving torque from the former to the latter.

In carrying out the present invention, means, including a torque transmitting connector 32 having a large diameter to length ratio relative to that of the crankshaft 12, is provided for joining the crankshaft with the spaced flywheel 28 in such a manner that no undue torsional vibrations are imparted to the engine crankshaft. The result of this arrangement is that the three main power transmission components mentioned above are spaced in an efficient, balanced relationship, and yet the periodicity of torsional vibration of the combined engine crankshaft and connector 32 is maintained substantially greater than the vibration periodicity set up by the engine within its normal speed range. In the present instance, it will be seen that the crankshaft 12, the clutch assembly 16, and the speed change transmission 18 are all arranged coaxially at a common level. It is further noted that the flywheel and presser plate unit, 28, 29, is well spaced inwardly from the rear face 10 of the engine block so that the differential gear arrangement 20 is nested upwardly into the resulting space between the engine and the unit 28, 29. In this way, the extent of outward overhang of the engine is reduced to a minimum since the rear engine face 10 is nearly directly above the differential arrangement 20 and, at the same time, the common level of the engine, the flywheel and presser plate unit 28, 29, and the change speed transmission 18 is satisfactorily low to provide excellent road stability.

Referring in more detail to the drawings, the connector 32 is formed with a hollow body including a rigid tube or shaft-like portion 34 having an outer diameter substantially equal to its length. The remainder of the connector 32 comprises a widely flaring skirt portion 36 which merges into a heavy flange 38 secured to and, in effect, incorporated with the flywheel 28 by means of machine screws 39. Thus, the skirt 36 and flywheel 28 form therein a clutch chamber 40. For the purpose of enhancing the torsional rigidity of the connector 32, the tube portion 34 thereof is provided with a plurality of peripherally spaced stiffening ribs 42 which extend longitudinally along the outer surface of the connector.

In order to secure the crankshaft 12 with the connector 32, a flexible soupling 44 is interposed therebetween. It will be seen that the coupling 44 comprises a block 46 abutted against the end of the crankshaft 12, a flexible laminated metallic disc 48 adjacent the block and secured with it to the crankshaft by suitable machine screws 49, and three equally spaced radial spider members 50 (only one is shown) projecting forwardly from the tube 34 and attached to the marginal edge of the disc 48, as by bolts 51. It is to be noted that the flexibility of the disc 48 enables the coupling 44 to accommodate universal movement of the elements joined so as to allow for possible misalignment between the crankshaft 12 and the connector and flywheel 32, 28, the connection yet being rigid torsionally.

The speed change transmission 18 may be of any appropriate construction and does not, in its details, constitute a part of this invention. Upon reference to Fig. 1, it will be seen that the speed change transmission 18 here illustrated includes a four-speed-and-reverse gear box, incorporating a main shaft 52 and a layshaft (not shown in the drawing). It is significant, however, to note that the main shaft 52, in the example, is hollow and is axially aligned with the intermediate shaft 30, so that both shafts 52, 30, are penetrated from end to end by a slidable thrust rod 54 to be described in more detail later.

In order to facilitate an understanding of the present invention, the speed change transmission 18 and the differential gear arrangement 20 will be described in broad outline form. It will be seen that a gear wheel 56 is keyed to the main shaft 52 at the rear end thereof and thus serves as the output member of the variable speed gearing 18. Enmeshed with the gear wheel 56 is an end gear 60 affixed to a spaced shaft 62, which shaft also carries a gear 61 for transmitting torque to the input ring gear of a differential 70 having coaxial longitudinal output shafts 66, 68. As will be seen, the gears 60 and 63 (the latter being fixed to the forward end of the shaft 62) are enmeshed with gears 64 and 65, respectively, journaled on the corresponding shafts 68, 66 and connected to those shafts by overrunning devices or clutches. In the present instance, the shaft 66 extends forwardly for driving the front inter-wheel differential gear arrangement 20 and the shaft 68 extends rearwardly to a rear inter-wheel differential gear (not shown), which is similar to that shown at 20. Briefly, the function of the special gearing is to permit a limited range of differential action between the shafts 66 and 68 and to lock these shafts together when either tends to overrun the other beyond a predetermined rate, as when one of the four road wheels tends to spin while being driven or tends to lock while being braked.

The aforesaid special gearing is the subject matter of my copending United States application for Letters Patent, Serial No. 360,128, filed June 8, 1953, now Patent No. 2,796,941, dated June 25, 1957, and assigned to the assignee of the present invention. Reference may be had to that copending application for further particulars with regard to the gearing arrangement.

In accordance with another of the aspects of the present invention, a novel arrangement of clutch elements is provided within the chamber 40, which arrangement includes a single clutch applying spring 72 centrally located within the chamber for actuating the inter-engageable flywheel 28 and presser plate 29 into a gripping position. In the illustrative embodiment of the invention, the remote clutch assembly 16 includes an annular friction plate 76 carried on a spring disc 77 which is integral with a hub 78 splined over the hollow intermediate shaft 30. As seen from Fig. 1, the friction plate 76 is interposed between the facing surfaces of the flywheel 28 and presser plate 29 and carries on either side thereof a pair of annular friction rings 81 for effecting gripping engagement of the components 28 and 29. It will be observed that the presser plate 29 includes a forwardly projecting central hub 84 which is rotatably journaled about the forward end of the intermediate shaft 30 by means of a roller bearing 85. The hub 84 is slidably piloted in a suitable socket 87 formed in the inner periphery of the hollow tube 34 by means of a forwardly projecting boss 80 integral with the presser plate hub and having a machined outer surface thereon for engagement with a corresponding machined surface inside the socket. In this way the connector 32, presser plate 29, and speed change gearing input shaft 30 are all piloted in precise alignment.

For the purpose of normally biasing the presser plate 29 rearwardly and into the engaged position, the central helical compression spring 73 is housed coaxially inside the torque transmitting tube 34, being held therein by opposing annular seats provided for it in the closed front end of the tube 34 and in the forward face of the presser plate hub 84, respectively. It will be seen that the spring 72 is of heavy construction and is pre-loaded for normally acting against the forward end of the axially secure connector 32 to urge the presser plate 29 rearwardly and into clutching engagement with the flywheel 28. In this way the friction plate 76 and friction rings 81 are sandwiched between the flywheel 28 and the presser 29 so that the plate 76 is thereby rotatively coupled with the flywheel and crankshaft. In the engaged position, then, rotative torque is transferred from the engine crankshaft 12 through the friction plate 76 and intermediate shaft 30 and then to the speed change transmission 18.

The present invention is also concerned with means for disengaging the clutch components against the bias of the spring 72. In this instance the thrust rod 54 is slidable axially through the main shaft 52 carrying the variable speed gearing 18, so that the forward end of the rod is adaptable to bear against the hub 84 and thereby shift the presser plate 29 forwardly against the action of the spring 72 and out of clutching engagement with the friction plate and flywheel 76, 28. A central recess 86 is provided in the hub 84 for slidably receiving the forward end of the thrust rod 54.

The thrust rod 54 is mounted at its rear end in a hydraulic piston and cylinder assembly 91 in such a manner that the rod may rotate freely within the shafts 52 and 30. Referring to the drawings, the rear end of the thrust rod 54 is received in a hydraulic cylinder 95 rigidly secured to the gear housing 15. Disposed within the cylinder 95 is an axially slidable piston 94 which is coaxial with the rod 54 and secured thereto. As will be seen, rotative motion of the thrust rod 54 is provided for by coupling the rod and piston 94 through a thrust bearing 92. In order to disengage the flywheel and clutch plate unit, 28, 29, the operator of the motor vehicle simply depresses his clutch pedal thereby admitting hydraulic pressure fluid through one of the pressure fluid connections 96 into the cylinder 95. At this time, the piston 94 is forced forwardly and pushes the thrust rod 54 end-wise into contact with the hub 84 of the presser plate 29 against the action of the compression spring 72 so that the presser plate 29 is disengaged from the flywheel 28.

For the purpose of relieving the axial thrust loads encountered in actuating the clutch between engaged and released positions from the engine output shaft 12, the flywheel 28 is formed with an integral annular central hub 98 which is journaled in the front portion of the gear case 15 by means of a ball bearing 100 capable of transmitting thrust as well as radial loads. As shown in the drawings, the hub 98 in turn supports the intermediate shaft 30 which is journaled therein by means of a roller bearing 102. An annular ring 104 secured to the gear case 15 by studs 106 holds the ball bearing 100 tightly in place therein. A circular retaining clip 108 locks about the flywheel hub 98 and forms a rear shoulder against which the bearing 100 seats. Thus it is seen that when the thrust rod 54 is forced forwardly to disengage the presser plate 29 against the yielding opposition of the central spring 72, the resulting force reaction is transmitted to the front end of the gear case 15 through the intermediary of the bearings 100 and 102. In this way, since the flywheel 28 is connected with the engine crankshaft 12 through the flexible coupling 44, the crankshaft is totally relieved of and safeguarded against the effects of such actuating thrust.

One of the advantages of the above described clutch operating mechanism is that it is especially compact and the parts in the vicinity of the flywheel 28 are all totally enclosed.

Another of the features of the above invention is that the single powerful clutch spring 72 is especially advantageous as compared with conventional clutch arrangements because it utilizes centrally applied clutch pressure rather than the usual plurality of smaller springs arranged in a circular series around the margin of the pressure plate and exerting somewhat varying pressures.

Another embodiment of the invention is shown in Fig. 3, wherein a fluid type of torque converter or coupling 16a is employed in lieu of the flywheel and clutch assembly 16 discussed above. In all other respects the environment of Fig. 3 is like that of Fig. 1. The two differ primarily in that the flywheel takes the form of a rear fluid casing 28a which is rotatably supported by means of a roller bearing 120 on an annular flanged sleeve 122 bolted to the forward end of the change speed gear case 15a. Since the invention is not concerned with the details of the fluid coupling, it is sufficient to note that a speed change gearing input shaft 30a extends through the sleeve 122 and is integrally formed at its forward end with a flange-like front casing 77a which, with the rear casing 28a, forms an annular fluid chamber 124. Those conversant with such couplings will understand that the rotary motion of the rear casing 28a is imparted to the front casing 77a and thus to the shaft 30a through hydraulic fluid contained within the chamber 124 by means of a plurality of aptly positioned vanes (not shown) carried on the casings 28a and 77a.

In accordance with the invention as expressed in this embodiment, a hollow elongated torque transmitting connector 32a is provided between the engine crankshaft 12a and the fluid type flywheel 28a in order to accommodate therebetween the differential gear arrangement 20a. Referring in detail to Fig. 3, it will be seen that the connector 32a comprises a shaft-like portion 34a having an outer diameter substantially equal to its length and a widely flaring skirt portion 36a. A heavy flange 38a, integrally formed about the marginal edge of the skirt 36a, is drivingly secured to the casing 28a by means of bolts 39a.

It will be seen that a flexible laminated disc type coupling 44a, similar to that shown in Fig. 1, is provided for securing the forward end of the connector 32a with the crankshaft 12a, thus providing for axial misalignment of the crankshaft and casing 28a.

It will also be observed that the input shaft 30a is journaled in a thrust bearing 100a mounted in the front portion of the gear case 15a. The bearing 100a is held tightly in place between a rear shoulder 108a formed on the shaft 30a and an annular locking ring 104a which is in screw-threaded engagement with the shaft 30a. Thus, the axial thrust loads encountered in actuating the fluid coupling 16a between engaged and disengaged positions are transmitted through the bearing 100a and the gear case 15a, rather than through the engine crankshaft 12a.

It is seen, then, that the arrangement of the fluid coupling 16a in spaced relationship rearwardly from the engine 10a provides space to accommodate the differential gear arrangement 20a between these units, thus resulting in a compact and stable vehicle power assembly. At the same time the connector 32a is torsionally rigid and thus transmits driving torque between the engine crankshaft 12a and the casing 28a while maintaining the periodicity of torsional vibration of the combined engine crankshaft and connector 32a substantially greater than the vibration periodicity which the engine may attain in the operation of the vehicle.

I claim:

1. In an automotive vehicle, the combination comprising an engine having a crankshaft, a housing having a forward portion attached to the engine, change speed gearing disposed in said housing and including an input member, a flywheel spaced from said engine, and means for transmitting driving torque from said crankshaft to said flywheel including a torsionally rigid hollow member connected therebetween, said member and said flywheel forming therebetween a clutch chamber, a clutch plate disposed in said chamber adjacent said flywheel, a friction disc interposed between said plate and said flywheel and rigidly secured to said input member, and a single spring in said chamber compressed against said plate for normally urging said disc into driving engagement with said flywheel.

2. In an automotive vehicle, the combination comprising an engine having a crankshaft, a housing having a forward portion attached to the engine, change speed gearing disposed in said housing and including an input member, a flywheel spaced from said engine, and means for transmitting driving torque from said crankshaft to said flywheel including a torsionally rigid hollow member connected therebetween, said member and said flywheel forming therebetween a clutch chamber, a friction disc in said chamber arranged adjacent one face of said flywheel and rigidly secured to said input member, and a clutch plate in said chamber for drivingly engaging said disc with said flywheel.

3. In an automotive vehicle, the combination comprising an engine having a crankshaft, a housing having a forward portion attached to the engine, change speed gearing disposed in said housing and including an input member, a flywheel and clutch assembly spaced from said engine and including a friction disc secured to said input member, means for transmitting driving torque from said crankshaft to said flywheel while yet maintaining the natural torsional vibration periodicity of the combined crankshaft and torque transmitting means substantially greater than the maximum vibration periodicity of the vehicle engine, said means comprising a torsionally rigid connector having shaft and skirt portions of substantially equal length, said skirt portion being rigidly secured to the marginal edge of said flywheel and said shaft portion having a torsionally rigid but otherwise flexible connection with said crankshaft.

4. In an automotive vehicle, the combination comprising an engine having a crankshaft, a housing having a forward portion attached to the engine, change speed gearing disposed in said housing and including an input member, a flywheel spaced from said engine and releasably secured to said input member, means for transmitting driving torque from said crankshaft to said flywheel while yet maintaining the natural torsional vibration periodicity of the combined crankshaft and torque transmitting means substantially greater than the maximum vibration periodicity of the vehicle engine, said means comprising a torsionally rigid member having a rigid connection with said flywheel and a torsionally rigid but otherwise flexible connection with said crankshaft.

5. In an automotive vehicle having a differential gear arrangement, the combination comprising an engine having a crankshaft, a flywheel and clutch assembly spaced from said engine to accommodate the differential gear arrangement between said engine and said assembly, change speed gearing connected between said assembly and the differential gear arrangement, and torsionally rigid means connecting said crankshaft with said flywheel and clutch assembly.

6. In an automotive vehicle having a differential gear arrangement, the combination comprising an engine having a crankshaft, a hydraulic torque converter spaced from said engine to accommodate the differential gear arrangement between said engine and said converter, change speed gearing connected between said converter and said differential gear arrangement, and torsionally rigid means connecting said crankshaft with said converter.

7. In an automotive vehicle having a differential gear arrangement, the combination comprising an engine having a crankshaft, a flywheel and clutch assembly spaced from said engine to accommodate the differential gear arrangement between said engine and said assembly, change speed gearing connected between said assembly and the differential gear arrangement, and torsionally rigid means connecting said crankshaft with said flywheel and clutch assembly, said means including a hollow member having a diameter equal to approximately half its length.

8. In an automotive vehicle having a differential gear arrangement, the combination comprising an engine having a crankshaft, a flywheel and clutch assembly spaced from said engine to accommodate the differential gear arrangement between said engine and said assembly, change speed gearing connected between said assembly and the differential gear arrangement, and a torsionally rigid connector between said crankshaft and said flywheel and clutch assembly, said connector being hollow and carrying external stiffening ribs thereon.

9. In an automotive vehicle having a differential gear arrangement, the combination comprising an engine having a crankshaft, a flywheel and clutch assembly spaced from said engine to accommodate the differential gear arrangement between said engine and said assembly, change speed gearing connected between said assembly and the differential gear arrangement, and torsionally rigid means connecting said crankshaft and said assembly, said means including a member secured at one end to said flywheel and connected at the other end to said crankshaft through a flexible but torsionally rigid coupling.

10. In an automotive vehicle having a differential gear arrangement, the combination comprising an engine having a crankshaft, a friction disc type flywheel and clutch assembly spaced from said engine to accommodate the differential gear arrangement between said engine and said assembly, change speed gearing connected between said assembly and the differential gear arrangement, a hollow torque transmitting connector between said crankshaft and said flywheel forming a chamber therein, a presser plate in said chamber adjacent one face of said flywheel, a driven clutch element between said plate and said flywheel, and a single spring in said chamber co-axial with the axis of rotation of said assembly and arranged to exert a concentrated thrust on said plate effective to drivingly engage said element with said flywheel.

11. In an automotive vehicle having a differential gear arrangement, the combination comprising an engine having a crankshaft, a friction disc type flywheel and clutch assembly spaced from said engine to accommodate the differential gear arrangement between said engine and said assembly, change speed gearing connected between said assembly and the differential gear arrangement, a hollow mainshaft carrying the change speed gearing, a hollow torque transmitting connector between said crankshaft and said flywheel forming a chamber therebetween, a presser plate in said chamber adjacent one face of said flywheel, a friction disc interposed between said plate and said flywheel and drivingly connected with said mainshaft, a single spring in said chamber co-axial with the axis of rotation of said assembly and arranged to exert a concentrated thrust on said plate for normally maintaining said disc drivingly engaged with said flywheel, and means acting against said spring for releasing said disc and flywheel, said means including a thrust rod extending axially through said hollow mainshaft and abutted against said presser plate, and an actuator acting through said rod to engage or disengage said disc.

12. In an automotive vehicle having a differential gear arrangement, the combination comprising an engine having a crankshaft, a friction disc type flywheel and clutch assembly spaced from said engine to accommodate the differential gear arrangement between said engine and said assembly, a gear case adjacent said assembly and containing change speed gearing connected with the differential gear arrangement, a hollow torque transmitting connector between said crankshaft and said flywheel forming a chamber therebetween, a presser plate in said chamber adjacent one face of said flywheel, a friction disc interposed between said plate and said flywheel and drivingly connected with said change speed gearing, a single spring in said chamber co-axial with the axis of rotation of said assembly and arranged to exert a concentrated thrust on said plate for normally maintaining said disc drivingly engaged with said flywheel, and said assembly being mounted in a thrust bearing located in said gear case for transmitting said spring exerted thrust through the gear case.

13. Mechanism for coupling an engine crankshaft with a second shaft, comprising, in combination, a flywheel spaced from the crankshaft, a hollow member connecting said flywheel with the crankshaft and forming a chamber with the flywheel, a clutch plate disposed in said chamber adjacent said flywheel, a friction disc rigidly secured to the second shaft and interposed between said clutch plate and said flywheel, and a single spring co-axial with said hollow member and interposed between said member and said clutch plate for normally urging said friction disc into gripping engagement with said flywheel.

14. In an automotive vehicle including an engine having a crankshaft, a housing having a forward portion attached to the engine, change speed gearing disposed in said housing and having an input member, and a flywheel spaced from said engine, clutch means for transmitting driving torque from said crankshaft to said input member comprising, in combination, a hollow member having a shaft portion and a skirt portion, said shaft portion being connected to said crankshaft and having its length substantially equal to its width, said skirt portion being of substantially the same length as the shaft portion and connected to the marginal edge of said flywheel, a clutch plate disposed within said skirt portion, a friction disc interposed between said plate and said flywheel and rigidly secured to said input member, and a single spring within said shaft portion for normally urging said disc into driving engagement with said flywheel.

15. In an automotive vehicle, a power unit comprising, in combination, an engine having a crankshaft, a change speed transmission having input and output members, a differential gear arrangement connected with said output member and located between said engine and said transmission, and a clutch assembly interposed between said engine crankshaft and said transmission input member, said assembly including a flywheel spaced from said engine, a friction disc rigidly secured to said input member and adapted for driving engagement with said flywheel, and an elongated torque transmitting member having connections at its ends to said flywheel and said crankshaft.

16. In an automotive vehicle having a differential gear arrangement, the combination comprising an engine having a crankshaft, a hydraulic torque converter including a fluid flywheel spaced from said engine to accommodate the differential gear arrangement between said engine and said converter, change speed gearing connected between said converter and said differential gear arrangement, and torsionally rigid means connecting said crankshaft with said flywheel.

17. In an automotive vehicle having a differential gear arrangement, the combination comprising an engine having a crankshaft, a flywheel spaced from said engine to accommodate the differential gear arrangement between said engine and said flywheel, change speed gearing connected between said flywheel and said differential gear arrangement, and torsionally rigid means connecting said crankshaft with said flywheel.

References Cited in the file of this patent

UNITED STATES PATENTS

| 2,695,696 | Iavelli | Nov. 30, 1954 |

FOREIGN PATENTS

| 479,063 | Germany | Apr. 5, 1930 |
| 615,284 | France | Jan. 4, 1927 |
| 673,691 | France | Oct. 8, 1929 |